United States Patent
Lin

(10) Patent No.: US 8,483,962 B2
(45) Date of Patent: Jul. 9, 2013

(54) METHOD FOR PROVIDING ROUTE INFORMATION AND THE SYSTEM THEREOF

(75) Inventor: Bing-Jin Lin, Taipei (TW)

(73) Assignee: Entertainment Machine Operator, Da-An District, Taipei (TW)

( * ) Notice: Subject to any disclaimer, the term of this patent is extended or adjusted under 35 U.S.C. 154(b) by 630 days.

(21) Appl. No.: 12/642,867

(22) Filed: Dec. 21, 2009

(65) Prior Publication Data

US 2011/0153192 A1 Jun. 23, 2011

(51) Int. Cl.
*G01C 21/34* (2006.01)
*G08G 1/123* (2006.01)

(52) U.S. Cl.
USPC ............. 701/533; 455/456.1; 455/456.2; 455/456.3; 455/456.6

(58) Field of Classification Search
USPC .......... 701/533; 705/13; 455/456.2; 370/253
See application file for complete search history.

(56) References Cited

U.S. PATENT DOCUMENTS

| | | | |
|---|---|---|---|
| 6,756,913 B1* | 6/2004 | Ayed | 340/992 |
| 7,822,384 B2* | 10/2010 | Anschutz et al. | 455/41.2 |
| 7,983,690 B2* | 7/2011 | Oesterling et al. | 455/456.1 |
| 2005/0073438 A1* | 4/2005 | Rodgers et al. | 340/944 |
| 2008/0270019 A1* | 10/2008 | Anderson et al. | 701/201 |
| 2009/0313077 A1* | 12/2009 | Wheeler, IV | 705/9 |
| 2010/0144367 A1* | 6/2010 | Goh et al. | 455/456.1 |
| 2010/0171642 A1* | 7/2010 | Hassan et al. | 340/992 |
| 2011/0099040 A1* | 4/2011 | Felt et al. | 705/7.12 |

* cited by examiner

*Primary Examiner* — Thomas Tarcza
*Assistant Examiner* — Tyler J Lee
(74) *Attorney, Agent, or Firm* — Winston Hsu; Scott Margo

(57) ABSTRACT

A method for providing route information and the system thereof are provided. The method includes receiving a route acquisition command including a GPS coordinate of a client device, searching for at least one service unit in a predefined range of the GPS coordinate, determining a suitable service unit from the at least one service unit for the client device, and sending matching route information to the client device and the suitable service unit.

14 Claims, 3 Drawing Sheets

METHOD FOR PROVIDING ROUTE INFORMATION AND THE SYSTEM THEREOF

BACKGROUND

1. Technical Field

Embodiments of the present disclosure relate to route information, and more particularly to a method for providing route information and the system thereof.

2. Description of Related Art

Usually, a dispatch-based taxi center includes a collection of taxis distributed within a geographic region, and a central dispatch office. A primary function of the central dispatch office is to receive customer pickup requests, match them with available service vehicles, and dispatch an available service vehicle to the customer.

One major cost of operating this system is the labor cost of a telephonist managing the dispatch-based taxi center, and the associated costs of office space, and telephone equipment, for example. In addition, the customer need to make a conventional audio telephone call to the dispatch office to designate the pickup address, which is time-consuming and cost-consuming.

Accordingly, a method and a system for providing route information are called for in order to overcome the limitations described.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
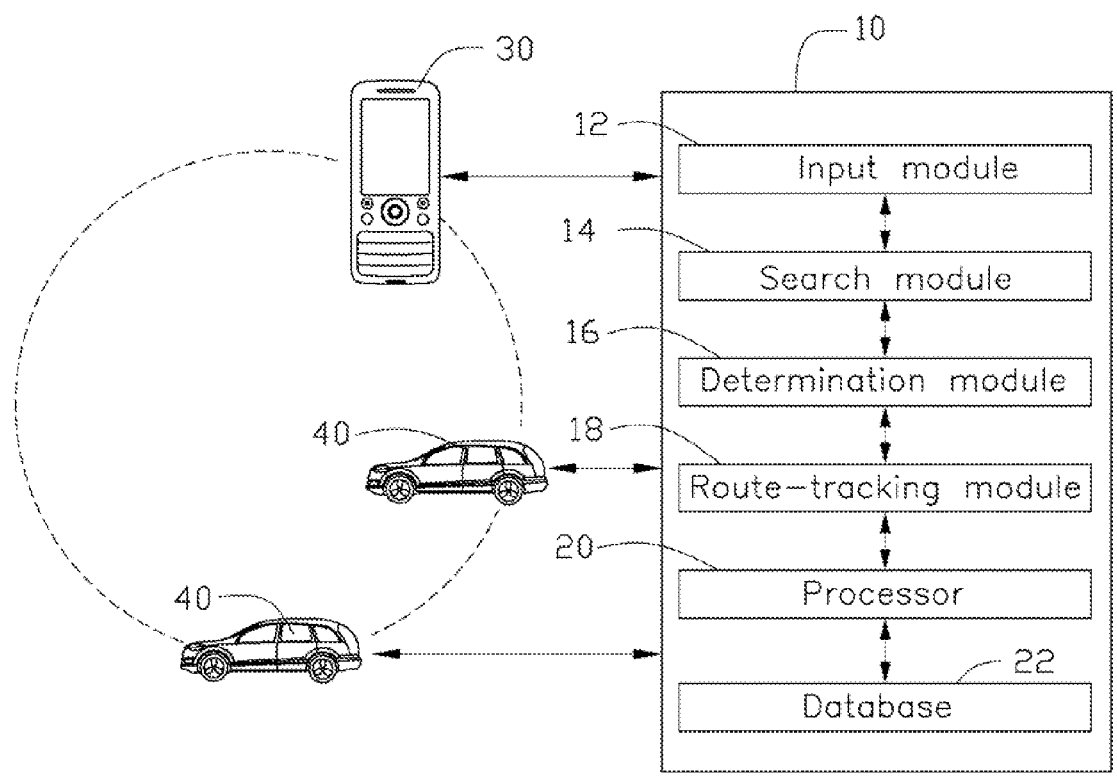
FIG. 1 is a system view of an embodiment of a system for providing route information.

FIG. 1 is a system view of an embodiment of a system 10 for providing route information for at least one client device 30 and a plurality of service units 40. The system 10 includes an input module 12, a determination module 14, a message module 16, a route-tracking module 18. A processor 20 may be used to execute one or more computerized operations for the modules 12-18.

As shown in FIG. 1, the client device 30 and the service units 40 are service members of an online community. The online community, in one embodiment, may comprise a network of linked communication devices, where people may communicate ideas among each other. Such a community may be used to inform people of locations of the client device 30 and the service units 40, including time and service availability of the client device 30 and the service units 40.

In the embodiment, the client device 30 and the service units 40 are equipped with Geo Positioning System (GPS) modules to periodically transmit GPS coordinates to the system 10. In other embodiments, only the service units 40 may be used to periodically transmit GPS coordinates to the system 10. In other embodiments, the client device 30 and the service units may be used to periodically transmit GPS coordinates to the online community.

In the illustrated embodiment, the client device 30 is a mobile phone, although other electronic devices, such as notebook computers, and personal digital assistants (PDAs), for example, are equally applicable while fully maintaining the scope of the disclosure. The service unit 40 is an electronic device, such as a navigator device, or a taximeter equipped with GPS modules.

The input module 12 is operable to receive the periodic GPS coordinates from the client device 30 and the service units 40.

The input module 12 is also operable to receive a route acquisition command from the client device 30. The route acquisition command includes identification (ID) of the client device 30 and the GPS coordinate of the client device 30.

In addition, the input module 12 is operable to receive update messages from the service units 40. The update message includes a service status and the GPS coordinate of the service unit 40. The service status indicates whether the service unit 40 is capable of providing driving services to a user of the client device 30.

Upon receiving the route acquisition command, the input module 12 searches for at least one service unit 40 in a predefined range of the GPS coordinate of the client device 30. In the embodiment, the predefined range may be adjusted by the system 10. For example, when the client device 30 is in downtown area, the predefined range may be 500 meters. When the client device 30 is in suburban area, the predefined range may be 2 kilometers.

The GPS coordinates of the client device 30 and information of the service unit 40, such as the service status and the GPS coordinates, within the predefined range are then transmitted to the determination module 14.

The determination module 14 is operable to determine a suitable service unit 40 for the client device 30.

Upon receiving the information of the service unit 40, the determination module 14 locates the service units 40 that are capable of providing driving services to the user of the client device 30 based on the service status indicated by the update messages.

The determination module 14 then calculates a distance between the located service units 40 and the client device 30. In one exemplary embodiment, the distance may be calculated based on the GPS coordinates and traffic regulations.

Figure 2:
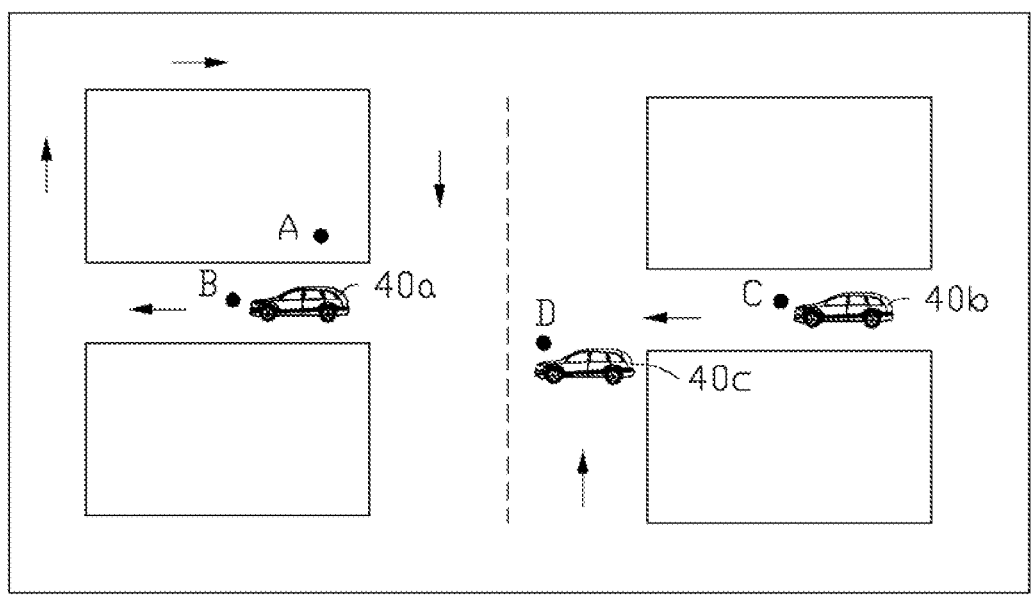
FIG. 2 is an illustration showing one example of a map showing positions of a plurality of service units and the client device.

FIG. 2 is an illustration showing one example of a map showing positions of a plurality of service units 40a-40c and the client device 30. In the illustrated example of FIG. 2, the client device 30 is in location A, and the service units 40a, 40b and 40c are respectively in location B, C and D. The arrows in FIG. 2 show the driving direction of the respective roads. For example, the service unit 40a is only allowed to drive leftward. In this example, although the distance between A and B, and between A and D are less than the distance between A and C, the service unit 40b in location C is determined as the suitable service unit 40 based on the driving directions of the roads.

After determining the suitable service unit 40, the determination module 14 calculates an estimated pick-up time based on the distance between the client device 30 and the suitable service unit 40. The estimated pick-up time and the GPS coordinate of the client device 30, and the ID of the service unit 40 are then transmitted to the message module 16.

The message module 16 is operable to send matching route information to the client device 30 and the suitable service unit 40. The matching route information is determined according to a location of the suitable service unit 40, a location of the client device 30, and a suitable route between the client device 30 and the suitable service unit 40. In one embodiment, the matching route information includes the estimated pick-up time and the GPS coordinate of the client device 30, and the ID of the suitable service unit 40.

In one embodiment, the system 10 further includes a route-tracking module 18 operable to record a route path of the client device 30 after the suitable service unit 40 starts to provide service to the client device 30. In one example, the taximeter of the suitable service unit 40 may automatically activate the route-tracking module 18 so that the route-tracking module 18 records the route path according to the GPS coordinates periodically transmitted to a database 22 of the system 10. In other embodiments, the route-tracking module 18 may be activated by the user of the client device 30. In addition, the GPS coordinates transmitted to the database 22 may be the GPS coordinates of the client device 30 or the suitable service unit 40.

In another embodiment, the recorded route path may be transmitted to other client devices designated by the client device 30 so as to provide enhanced safety functions to the client device 30.

Figure 3:
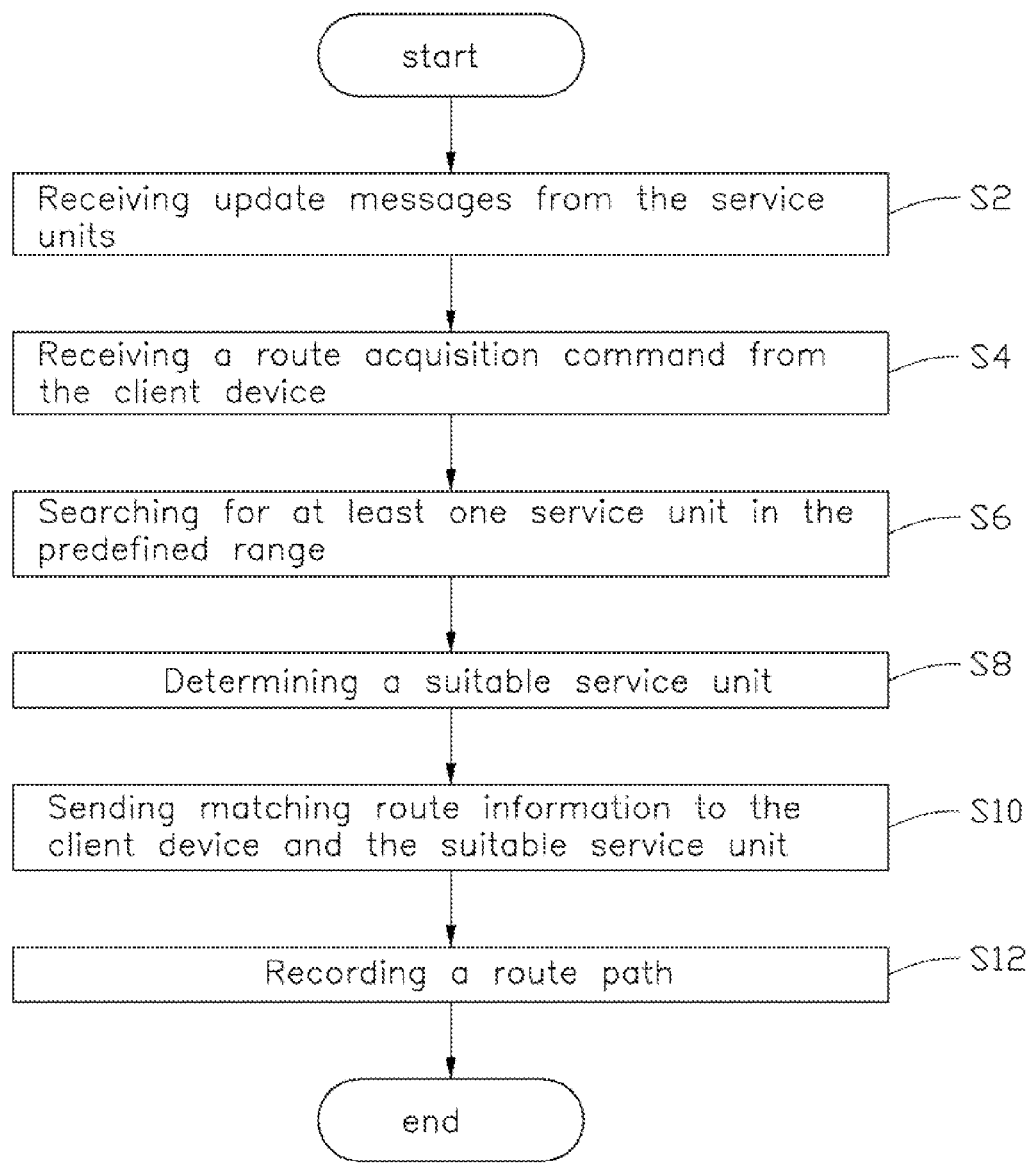
FIG. 3 is a flowchart of one embodiment of a method for providing route information.

FIG. 3 is a flowchart of one embodiment of a method for providing route information. The method of FIG. 3 may used to provide route dispatch services for the client device 30 and at least one service units 40. Depending on the embodiment, additional blocks may be added or deleted and the blocks may be executed in order other than that described.

In block S2, the input module 12 receives update messages from the at least one service unit 40. The update message includes a service status and GPS coordinate of the service unit 40.

In block S4, the input module receives a route acquisition command including the ID and the GPS coordinate of the client device 30.

In block S6, the input module 12 searches for at least one service unit 40 in the predefined range of the GPS coordinate of the client device 30. In the embodiment, the predefined range may be adjusted by the system 10.

In block S8, the determination module 14 determines a suitable service unit 40 for the client device 30. The determination module 14 locates the service units 40 that are capable of providing driving services based on the service status indicated by the update messages. The determination module 14 then calculates a distance between the located service units 40 and the client device 30 based on the GPS coordinate of the client device 30 and the traffic regulations.

In block S10, the message module 16 sends matching route information to the client device 30 and the suitable service unit 40. In one embodiment, the matching route information includes an estimated pick-up time and the GPS coordinate of the client device 30, and the ID of the suitable service unit 40.

In block S12, the route-tracking module 18 records a route path of the client device 30 after the service units 40 starts to provide driving services to the client device 30. In another embodiment, the data transmission module 18 records the route path of the service unit 40 after the service unit 40 starts to provide driving services to the client device 30.

It is important to note that while the disclosure has been described in the context of a fully functioning data processing system, those of ordinary skill in the art will appreciate that the processes of the disclosure are capable of being distributed in the form of a computer readable medium of instructions and a variety of forms and that the disclosure applies equally regardless of the particular type of signal bearing media actually used to carry out the distribution. Examples of computer readable media include recordable-type media such as floppy disc, a hard disk drive, random access memory (RAM), and compact disc-read only memory (CD-ROM), as well as transmission-type media, such as digital and analog communications links.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computer-implemented method for providing route information, the method performed by a client device comprising:
   receiving a route acquisition command comprising a Global Positioning System (GPS) coordinate of the client device;
   searching for at least one service unit that provides driving services in a predefined range of the GPS coordinate of the client device, wherein the predefined range is adjusted according to the GPS coordinate of the client device;
   calculating a distance between each of the located service units and the client device based on a GPS coordinate of the service unit and the GPS coordinate of the client device;
   determining a suitable service unit from the at least one service unit for the client device according to traffic regulations and the calculated distance; and
   sending matching route information to the client device and the suitable service unit, wherein the matching route information is determined according to a location of the suitable service unit, a location of the client device, and a suitable route between the client device and the suitable service unit.

2. The method as claimed in claim 1, wherein the at least one service unit periodically sends update messages, the update messages comprising a service status and a GPS coordinate of the at least one service unit.

3. The method as claimed in claim 1, wherein the client device and the at least one service unit are devices of members of an online community.

4. The method as claimed in claim 1, wherein the matching route information comprises an estimated pick-up time and the GPS coordinate of the client device, and an identification of the at least one service unit.

5. The method as claimed in claim 1, further comprising:
   periodically transmitting the GPS coordinates of the client device to a database upon activation of a route-tracking function by the client device.

6. The method as claimed in claim 1, further comprising:
   periodically transmitting the GPS coordinates of the at least one service unit to a database upon activation of a route-tracking function by the at least one service unit.

7. A system located in a client device for providing route information, the system comprising:
   an input module of the client device to receive a route acquisition command indicative of a Global Positioning System (GPS) coordinate of the client device, and to search for at least one service unit that provides driving services in a predefined range of the GPS coordinate of the client device, wherein the predefined range is adjusted according to the GPS coordinate of the client device;

a determination module of the client device to calculate a distance between each of the located service units and the client device based on a GPS coordinate of the service unit and the GPS coordinate of the client device, and determine a suitable service unit from the at least one service unit for the client device according to traffic regulations and the calculated distance; and a message module of the client device to send a matching route information to the client device and the suitable service unit, wherein the matching route information is determined according to a location of the suitable service unit, a location of the client device, and a suitable route between the client device and the suitable service unit; and a processor of the client device to execute the input module, the determination module the message module, and the route-tracking module.

8. The system as claimed in claim 7, wherein the input module is configured for periodically receiving update messages from a plurality of service units, the update messages comprising a service status and a GPS coordinate of the at least one service unit.

9. The system as claimed in claim 7, wherein the client device and the service unit are devices of members of an online community.

10. The system as claimed in claim 7, wherein the matching route information comprises an estimated pick-up time and the GPS coordinate of the client device, and the identification of the at least one service unit.

11. The system as claimed in claim 7, wherein the system further comprises a route-tracking module configured for recording a route path of the client device upon activation of a route-tracking function by the client device.

12. The system as claimed in claim 7, wherein the system further comprises a route-tracking module configured for recording a route path of the suitable service unit upon activation of a route-tracking function by the suitable service unit.

13. A non-transitory computer-readable storage medium for providing route information, the computer-readable medium having stored thereon instructions that, when executed by a processor in a client device cause the client device to:

receive a route acquisition command comprising a Global Positioning System (GPS) coordinate of the client device;

search for at least one service unit that provides driving services in a predefined range of the GPS coordinate, wherein the predefined range is adjusted according to the GPS coordinate of the client device;

calculate a distance between each of the located service units and the client device based on a GPS coordinate of the service unit and the GPS coordinate of the client device;

determine a suitable service unit from the at least one service unit for the client device according to traffic regulations and the calculated distance; and send matching route information to the client device and the suitable service unit, wherein the matching route information is determined according to a location of the suitable service unit, a location of the client device, and a suitable route between the client device and the suitable service unit.

14. The non-transitory computer-readable storage medium as claimed in claim 13, wherein the at least one service unit periodically sends update messages, the update messages comprising a service status and a GPS coordinate of the at least one service unit.

* * * * *